United States Patent [19]

Sweet et al.

[11] Patent Number: 5,437,537
[45] Date of Patent: Aug. 1, 1995

[54] CART LOADING MACHINE

[75] Inventors: Robert P. Sweet, Red Wing; Mark R. Rosa, Inver Grove Heights; Alexander Vigdorovich, St. Paul; James E. Kovacs; Patrick J. Geraghty, both of Minneapolis, Minn.

[73] Assignee: Cannon Equipment Company, Cannon Falls, Minn.

[21] Appl. No.: 711,675

[22] Filed: Jun. 6, 1991

[51] Int. Cl.⁶ ............................................. B65G 67/04
[52] U.S. Cl. ........................... 414/400; 198/456; 414/401; 414/291.6
[58] Field of Search ............... 198/456, 458; 414/398, 414/400, 401, 791.6, 794.3

[56] References Cited

U.S. PATENT DOCUMENTS

| | | | |
|---|---|---|---|
| 2,827,999 | 3/1958 | Raynor | 198/456 X |
| 3,294,257 | 12/1966 | Davies et al. | 414/794.3 X |
| 3,594,977 | 7/1971 | Grasvoll | 414/794.3 X |
| 4,128,163 | 12/1978 | Rana et al. | |
| 4,256,222 | 3/1981 | Gunti | 198/457 |
| 4,331,415 | 5/1982 | Blatz et al. | |
| 4,536,119 | 8/1985 | Miaskoff | |
| 4,658,715 | 4/1987 | Stobb | |
| 4,917,559 | 4/1990 | van der Schoot | 414/401 X |

FOREIGN PATENT DOCUMENTS

| | | | |
|---|---|---|---|
| 3536541 | 4/1987 | Germany | 414/794.3 |
| 244712 | 12/1985 | Japan | 414/794.3 |
| 154524 | 6/1988 | Japan | 414/794.3 |
| 1331767 | 8/1987 | U.S.S.R. | 414/401 |

Primary Examiner—Michael S. Huppert
Assistant Examiner—Janice L. Krizek
Attorney, Agent, or Firm—Sten Erik Hakanson

[57] ABSTRACT

An apparatus and method for automatically loading successive layers of similarly shaped objects, such as newspaper bundles and the like, into wheeled carts. The bundles are first delivered at a controlled rate from a source thereof to a device that arranges and delivers the objects in organized groups to an initial loading position. The organized group is then moved onto a carrier from the loading position. The carrier then moves from its loading position to a position within the wheeled cart. A blocking plate serves to prevent the objects from moving with the carrier as it move back to its initial loading position wherein the objects are deposited in the cart. The cart is held on a lift and is first moved to a top loading position for receiving the first layer of bundles and subsequently lowered the needed amount for receiving successive layers of bundles. An electronic control provides for the coordinated control of the systems of the present invention so that the cart can be automatically and quickly filled with layers of the organized bundles.

32 Claims, 13 Drawing Sheets

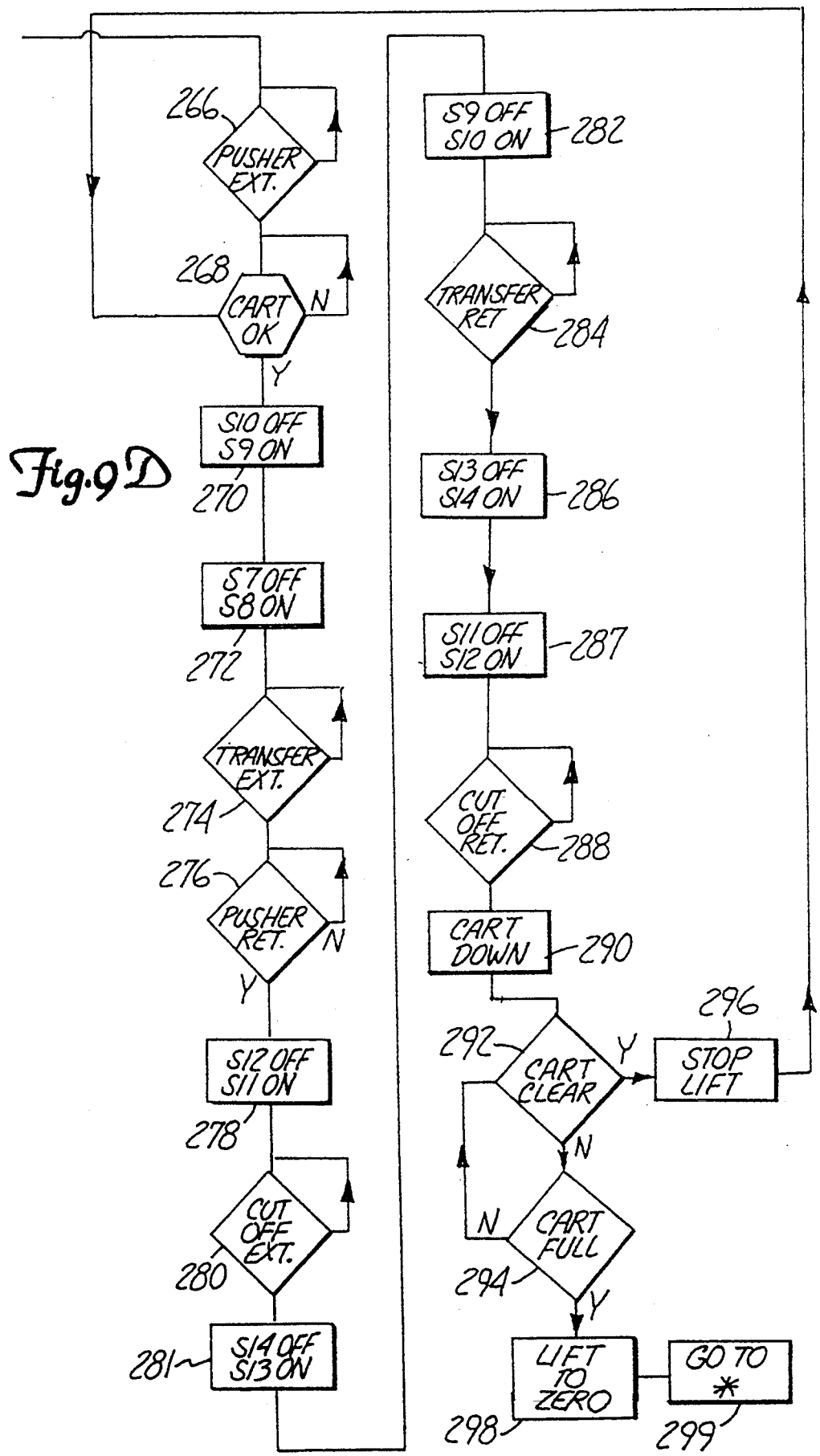

CART LOADING MACHINE

FIELD OF THE INVENTION

The present invention relates generally to cart loading equipment and specifically to equipment for loading multiple bundles of newspapers, and the like, onto moveable carts.

BACKGROUND OF THE INVENTION

Currently, after printing, newspapers are arranged in bundles for distribution to various locations. This distribution is generally achieved through the use of trucks for the delivery of the bundles to the particular locations. In addition, there is now a trend among newspapers of large circulation in major metropolitan areas to first deliver the bundles to one of several distribution centers, from which centers the bundles are dispersed to the parties responsible for the delivery of the papers to the ultimate sales location, office or residence. A major problem concerns the loading of the delivery trucks which loading continues to require the manual handling of each bundle. Such a process is, of necessity, labor intensive and time consuming, and therefore inefficient and costly.

Accordingly, it would be highly desirable to have an apparatus and method for automating the process of handling and loading bundled newspapers, and the like, onto trucks.

SUMMARY OF THE INVENTION

The present invention discloses a method and apparatus for loading bundles of newspapers, and the like, onto moveable carts. The invention herein includes a conveyor and arranging means, a loading means and a lift means. The conveyor means delivers and assembles groupings of newspaper bundles to a first loading position within the loading means. A first pneumatic cylinder is secured to the frame of the loading means and extends substantially perpendicular to the travel of the conveyor means. A plate secured to the first cylinder provides for the pushing of the bundle grouping into a transfer station. The transfer station is slideably suspended from the loading means frame. A second pneumatic cylinder is secured to the frame and provides for moving the transfer station in a direction substantially parallel with the direction of movement of the first cylinder into a wheeled cart. A third cylinder is secured to the frame and extends substantially vertically with respect to the horizontal orientation of the first two cylinders. The third cylinder is secured to a bundle stop plate and provides for moving the plate up and down in a vertical direction. The lift means is positioned adjacent the loading machine and provides for receiving of a wheeled cart thereon, and provides for controllable raising and lowering of the cart.

In operation, a cart is loaded onto the lift and the lift is operated to move the cart to a full up or top position. The conveyor is then operated to deliver the grouping of the bundles to the first position adjacent the pushing plate of the first cylinder. The first cylinder is then operated to load the grouping of bundles into the transfer station. The second cylinder then operates to move the transfer station into the cart, after which the third cylinder is operated to lower the bundle stop plate behind the grouping of bundles held in the transfer cart. The second cylinder is then operated to retract the transfer station, whereupon the bundle stop plate blocks the movement of the bundles which are then deposited in the cart as the transfer cart slides from beneath the bundles. The third cylinder is then operated to lift the bundle stop plate and the cart lift is operated to lower the cart in an amount approximately equal to the height of the bundles for permitting subsequent repeat of the above described sequence wherein another layer of bundles is added to the cart. This procedure continues until the cart is fully loaded.

The present invention also includes cart conveyor means for automatically delivering carts to the lift and removing them therefrom when full. Once loaded, the cart can be removed from the lift and rolled directly onto a truck. Thus, once the truck is suitably filled with carts, the newspapers can then be easily distributed.

It can be appreciated by those of skill that the present invention provides an apparatus and method for eliminating the manual handling of individual bundles of newspapers, and the like, presently required in the loading such articles for ultimate distribution.

DESCRIPTION OF THE DRAWINGS

A further understanding of the structure and advantages of the present invention can be had by reading the following detailed description which refers to the following figures, wherein.

DETAILED DESCRIPTION

Figure 1:
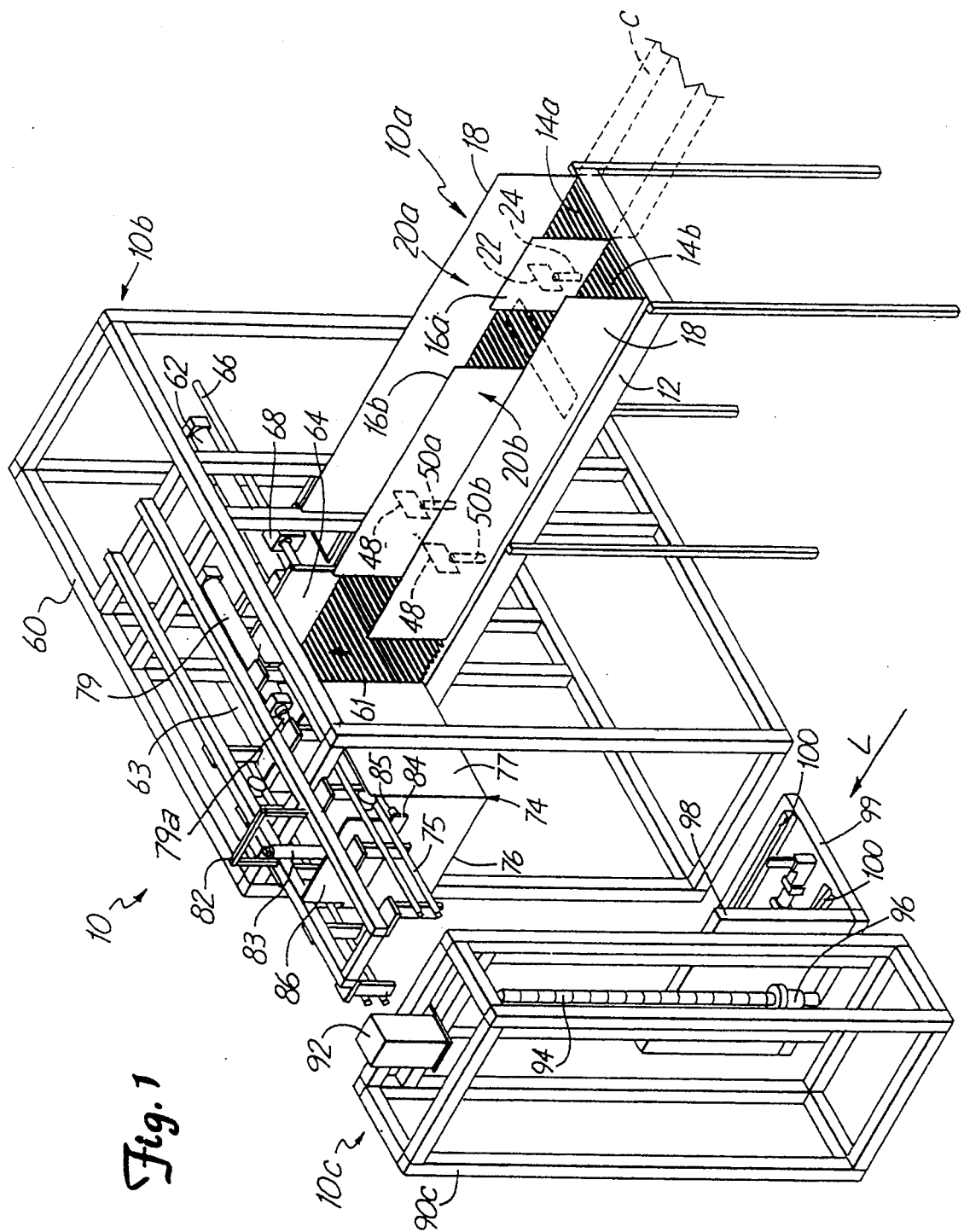
FIG. 1 shows a perspective view of the present invention.

The loading machine of the present invention is seen in FIGS. 1-4, and generally referred to by the numeral 10. Machine 10 includes an arranging portion 10a, a loading portion 10b and a lift portion 10c. Portion 10a includes a rigid frame 12 having a pair of parallel conveyor portions 14a and 14b having a plurality of driven rollers 15. Portions 14a and 14b are separated by a central divider wall having portions 16a and 16b. End walls 18 extend along the length of conveyors 14a and 14b, and together with wall portions 16a, 16b define right and left channels 20a and 20b respectively. A movable stop plate 22 is operated by a pneumatic cylinder 24, and both plate 22 and cylinder 24 are secured below conveyor 14a. In particular, plate 22 is positioned to extend upwardly between rollers 15 of conveyor 14a. An emitting/receiving photo-eye "ERPE" 27 is secured below conveyor 14a and positioned to permit transmission of light upwardly between shortened rollers 15a. An ERPE 28 is secured to arranging portion 10a and positioned in a direction across conveyor 14a. ERPE 28 is secured to the exterior of wall 18 of right channel 20a wherein a hole 29 in such wall 18 permits the necessary transmission of light therethrough.

A lifting and lane changing means 30 is secured below conveyors 14a and 14b and, as is known in the art, changing means 30 includes a lift portion 32 having a pair of bars 34 that are operable by cylinders 36 to extend upwardly between rollers 15 and above the top surface of conveyor portion 14a. Changing means 30 also includes a cylinder 38 for moving lift portion 32 between channels 20a and 20b, and right and left channel proximity switches 40a and 40b respectively. An ERPE 42 is, in a similar manner with ERPE 27, secured below conveyor 14a and is directed upwardly through rollers 15. A further ERPE 44 is positioned centrally of conveyors 14a and 14b and is directed angularly across the top surface of conveyor 14b to a reflector 46 secured to wall 18 of channel 20b. A pair of stop plates 48 operated by cylinders 50a and 50b are secured below conveyors 14a and 14b at the ends thereof adjacent assembly portion 10b. As with plate 22, plates 48 are positioned normally-up and are moveable up and down between rollers 15.

Figure 2:
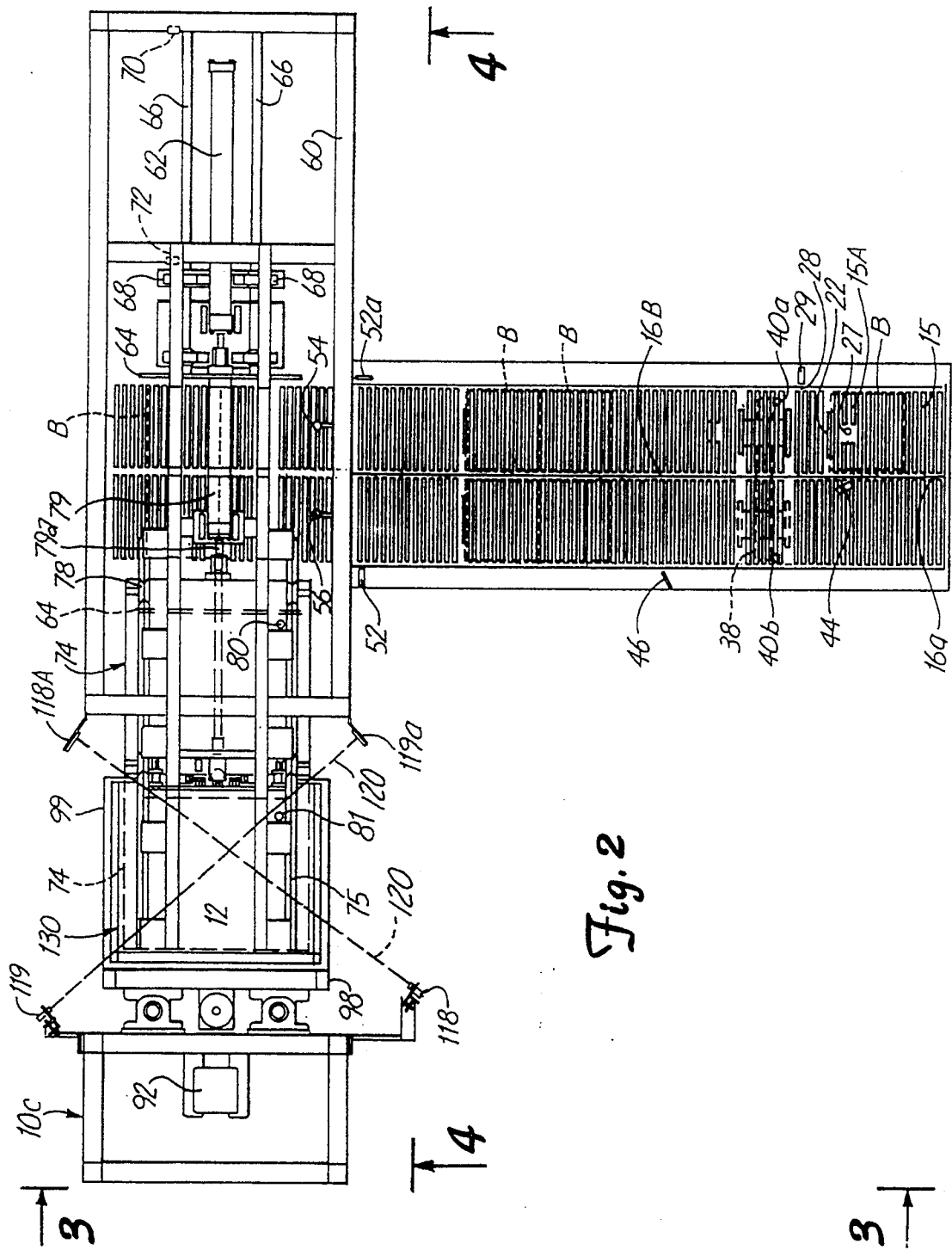
FIG. 2 shows a top plan view of the present invention.
Figure 4:
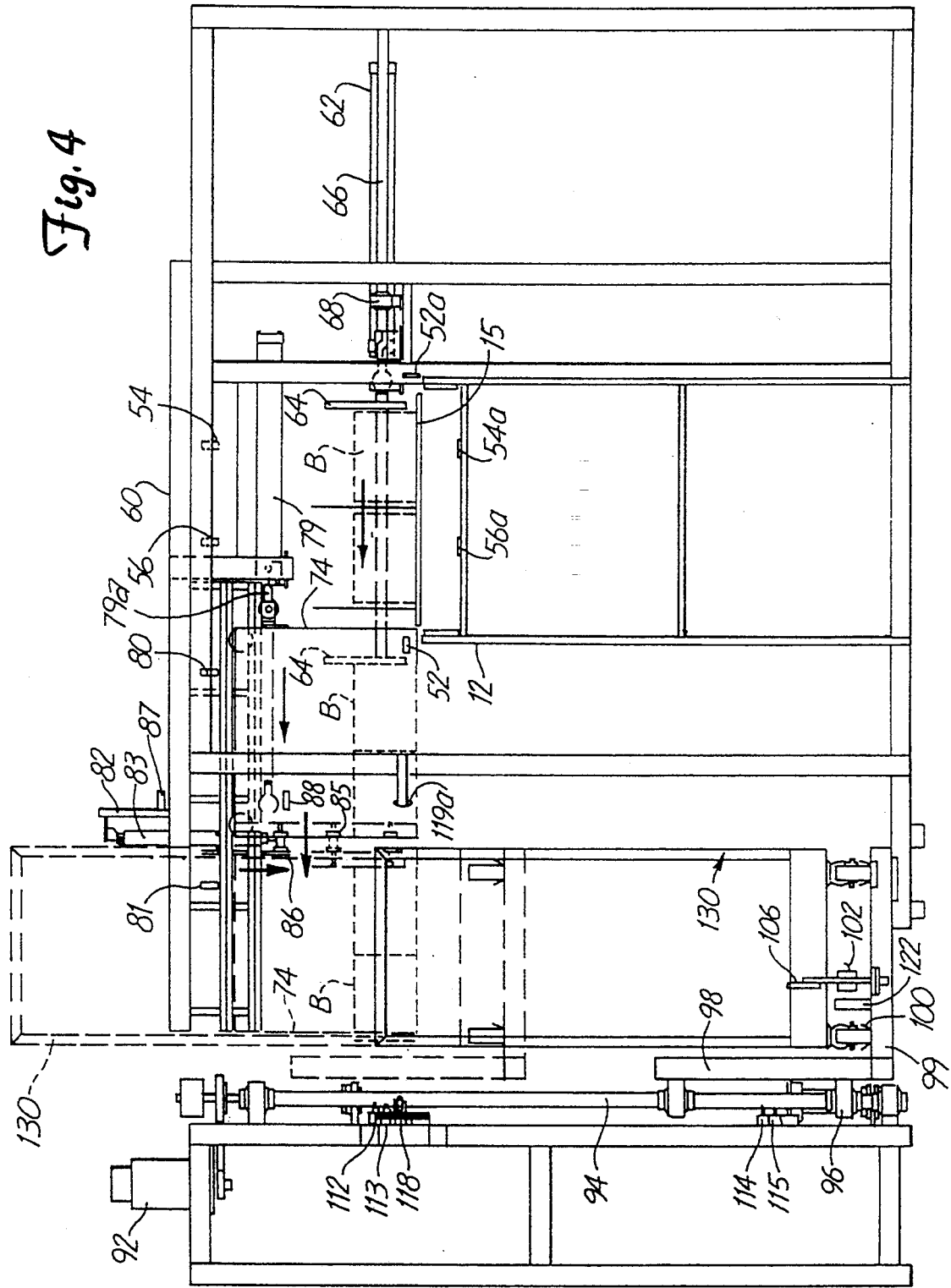
FIG. 4 shows a side plan view along line 4—4 of FIG. 2.

As seen specifically in FIGS. 1, 2 and 4, assembly portion 10b includes a frame 60 into which conveyors 14a and 14b extend and terminate, and define a first bundle loading position 61 blocked on one end by a bundle stop wall 63. ERPE's 52, 54 and 56 are secured to frame 60 and directed towards reflectors 52a, 54a and 56a respectively wherein ERPE 52 is pointed horizontally across conveyors 14a and 14b, and ERPEs 54 and 56 are pointed downwardly at conveyors 14a and 14b. A cylinder 62 is secured to frame 60 and provides for operating a flat pushing plate 64.

Plate 64 includes a pair of guide rods 66 secured thereto. Guide rods 66 extend through guides 68 for maintaining plate 64 in a plane substantially perpendicular to the extension of cylinder 62. Guide rod proximity switches 70 and 72 are mounted to frame 60 adjacent the extension of one of the guide rods 66.

A U-shaped transfer station 74 or carrier is slidably suspended from a pair of tracks 75 of frame 60. In particular, transfer station 74 includes a carrier bottom surface 76 having walls 77 integral therewith and extending upwardly therefrom. A plurality of wheels 78 cooperate with and run on tracks 75 and are rotatively secured to walls 77 for providing the slidable suspension of carrier 74. A cylinder 79 having a piston 79a is connected to frame 60 and to carrier 74 for providing motion thereof in a direction substantially parallel with the extension of pushing plate cylinder 62. Proximity switches 80 and 81 are secured to frame 60 adjacent cylinder 79 for sensing the position of carrier 74.

Figure 5:
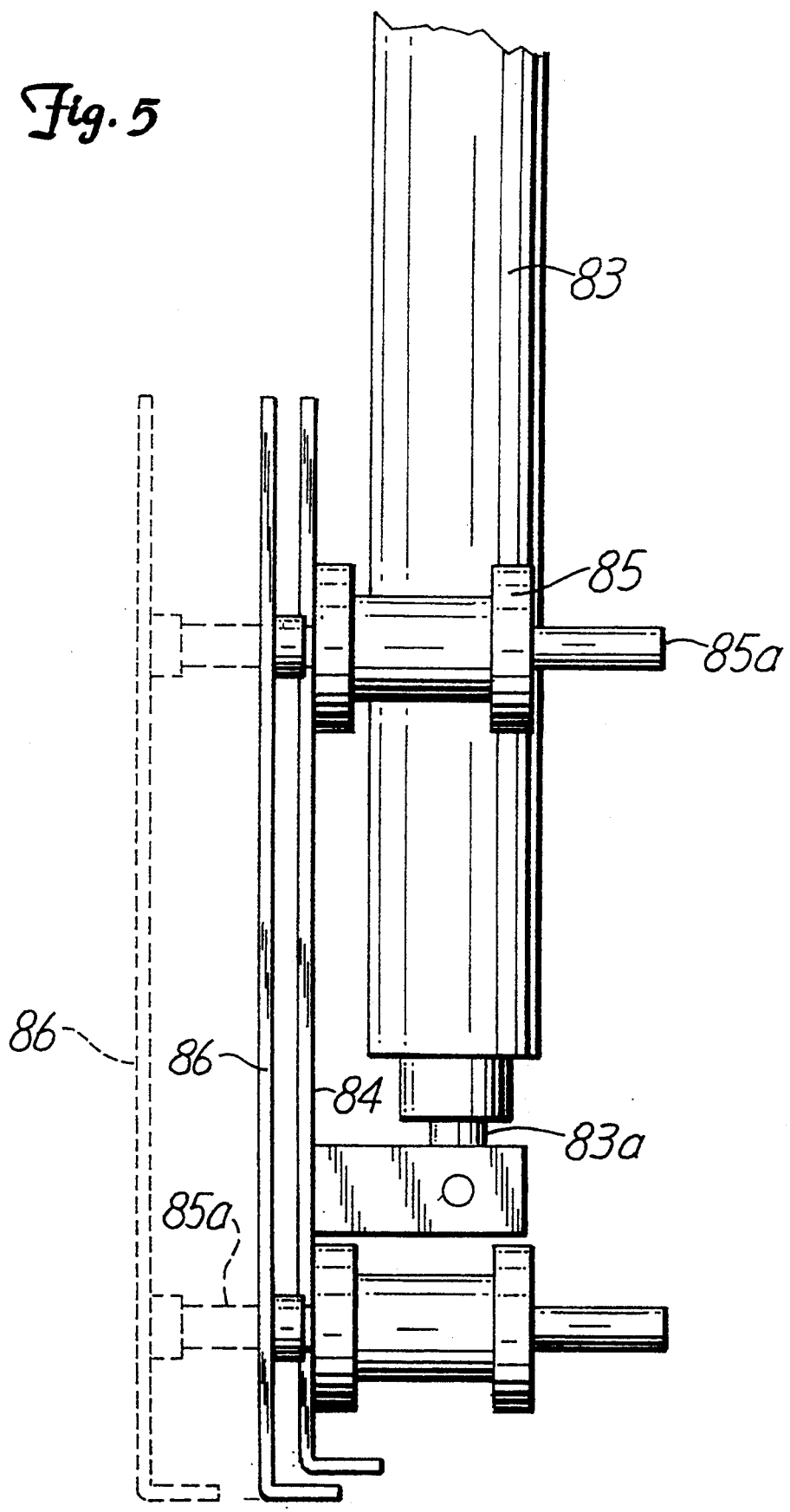
FIG. 5 shows an enlarged side view of the stopping plate.

Frame 60 includes a support portion 82 to which is secured a cylinder 83. Cylinder 83 has a piston 83a connected to a rigid plate 84, and plate 84 has four cylinders 85 secured thereto. Cylinders 85 have pistons 85a extending through plate 84 and secured to movable plate 86. Cylinder 83 and serves to operate plate 84, and with it, cylinders 85 and plate 86 through a vertical orientation substantially perpendicular to the extension and travel of transfer station 74 and pushing plate 64. Cylinders 85 provide for moving plate 86 horizontally as indicated in FIG. 5. A pair of proximity switches 87 and 88 are secured adjacent cylinder 83 for sensing the full retraction or extension respectively of cylinder 83.

Figure 3:
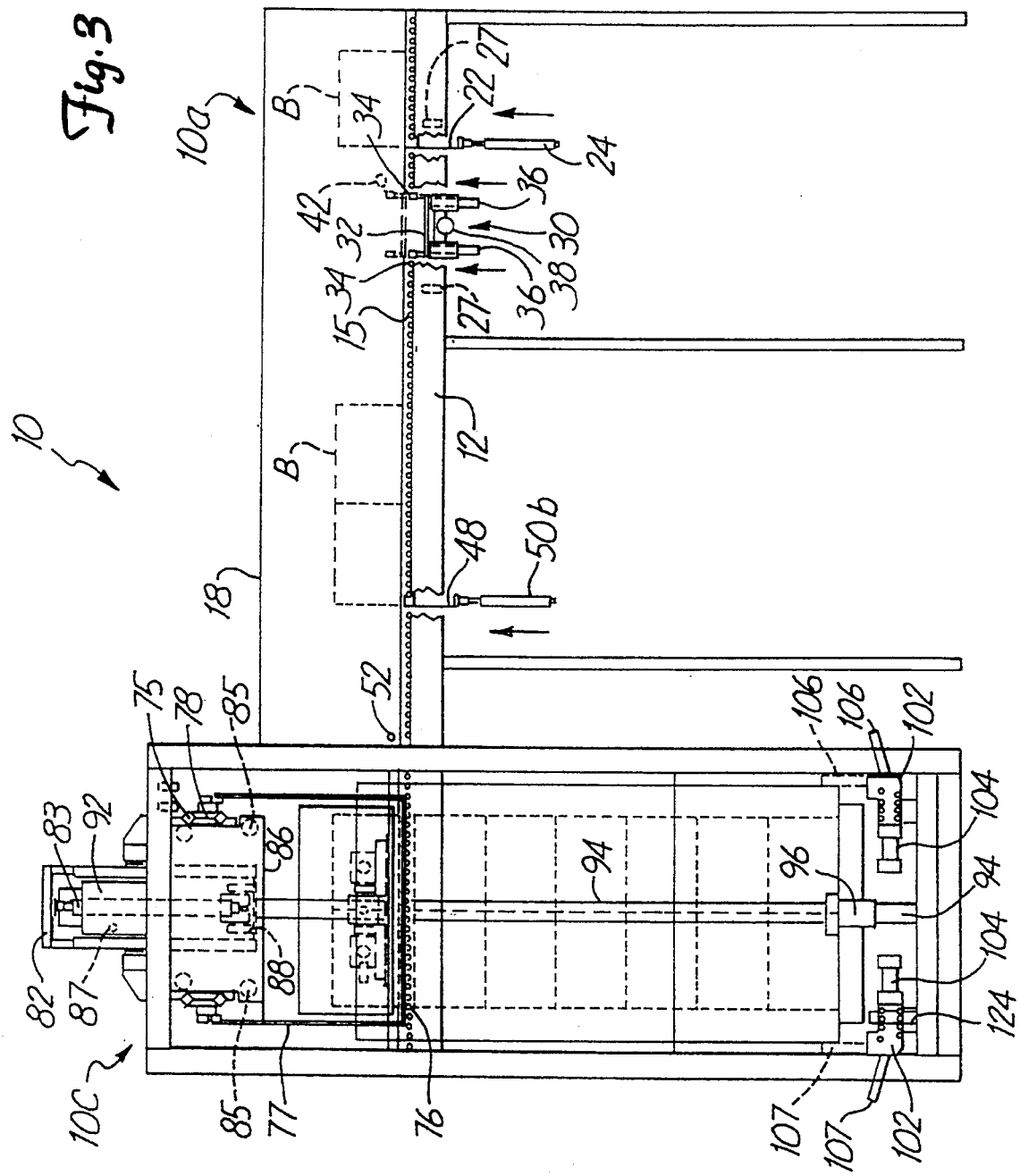
FIG. 3 shows a side plan view along line 3—3 of FIG. 2.

Lift means 10c includes a rigid frame structure 90 to which is secured a step motor 92. Lift 10c also includes a screw shaft drive mechanism having a screw shaft 94 and nut 96. A cart support 98 is secured to nut 96 and includes cart support base 99 having a pair of cart wheel guiding tracks 100 thereon. As seen in FIG. 3, lift means 10c also includes cart retaining mechanisms 102. Mechanisms 102 are operated independently by pneumatic cylinders 104 that separately operate clamping arms 106 and 107 respectively. Arms 106 and 107 are operable between down positions as indicated by the solid lines and up positions as indicated by dashed lines as seen in FIG. 3. Lift 10c has four platform position limit switches 112, 113, 114 and 115. Frame 90 also includes a pair of ERPE's 118 and 119 having respective reflectors 118a and 119b. ERPEs 118 and 119 and reflectors 118a and 119b, are positioned on frame 90 and frame 60 at a level substantially equivalent with the level of base 76 of carrier 74. In addition, ERPEs 118 and 119 are positioned at opposite corners with respect to each other such that the light emitted by each forms a crossing pattern, as indicated by the dashed lines 120 of FIG. 2. A cart loading proximity switch 122 and a cart loaded proximity switch 124 are located on base 99.

Figure 6:
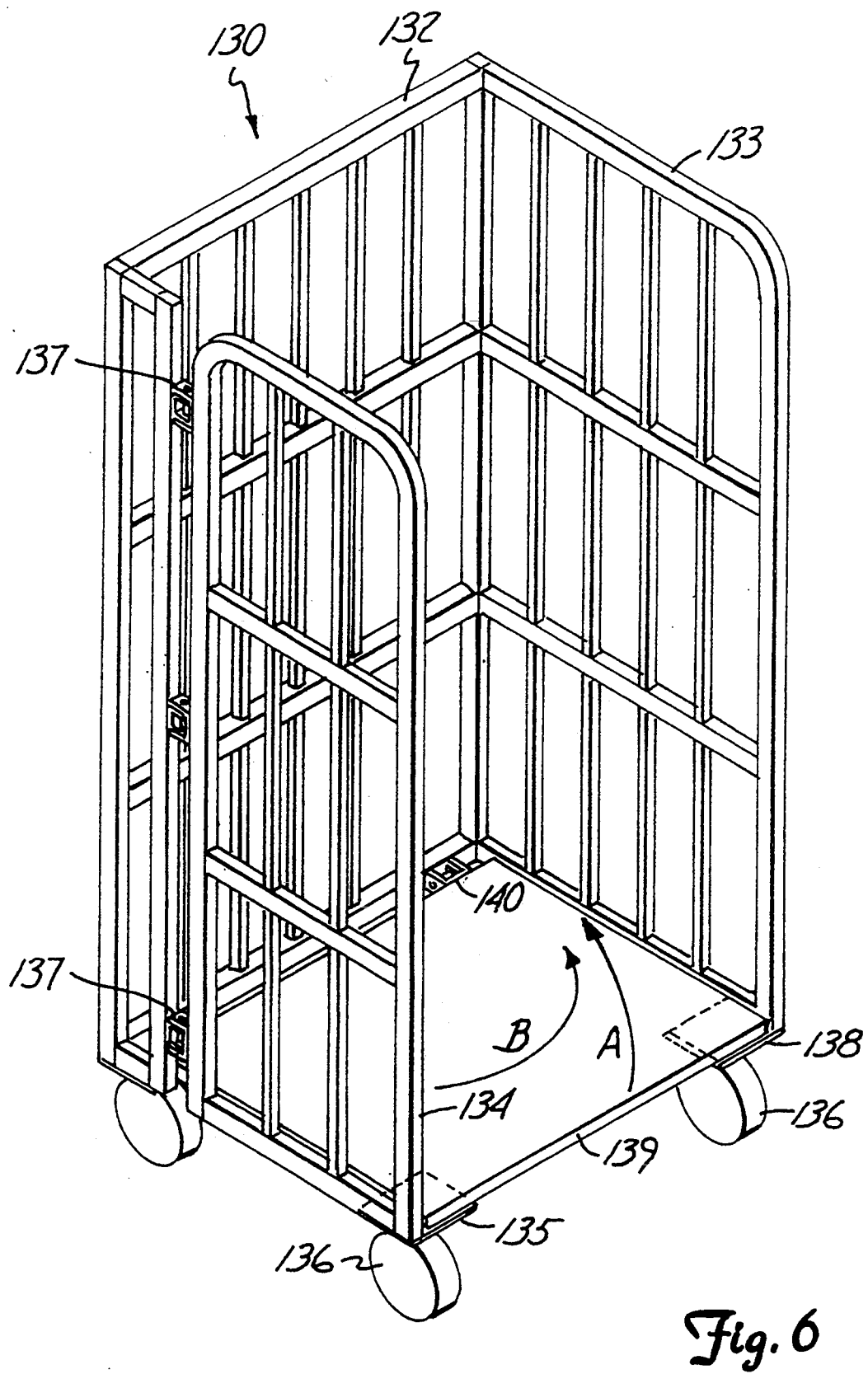
FIG. 6 shows a perspective view of the cart of the present invention.

Lift means 10c provides for the lifting of a cart 130. As more particularly seen in FIGS. 6 and 7, cart 130 includes a back wall 132 to which is rigidly secured a sidewall 133. A second sidewall 134 is integral with a caster plate 135 to which is secured one of four wheels 136. Sidewall 134 is hingedly secured to back wall 132 by hinges 137. Cart 130 also includes a caster plate 138 integral with side 133. A base plate 139 is hingedly secured to the bottom of back wall 132 by hinges 140. Cart 130 also includes a pair of retaining straps 141 secured to the top of back wall 132 and to base plate 139. Each strap 141 includes an adjustment buckle 142. Frame sides 132, 133 and 134, along with base plate 139, define an interior cart loading volume.

Figure 8:
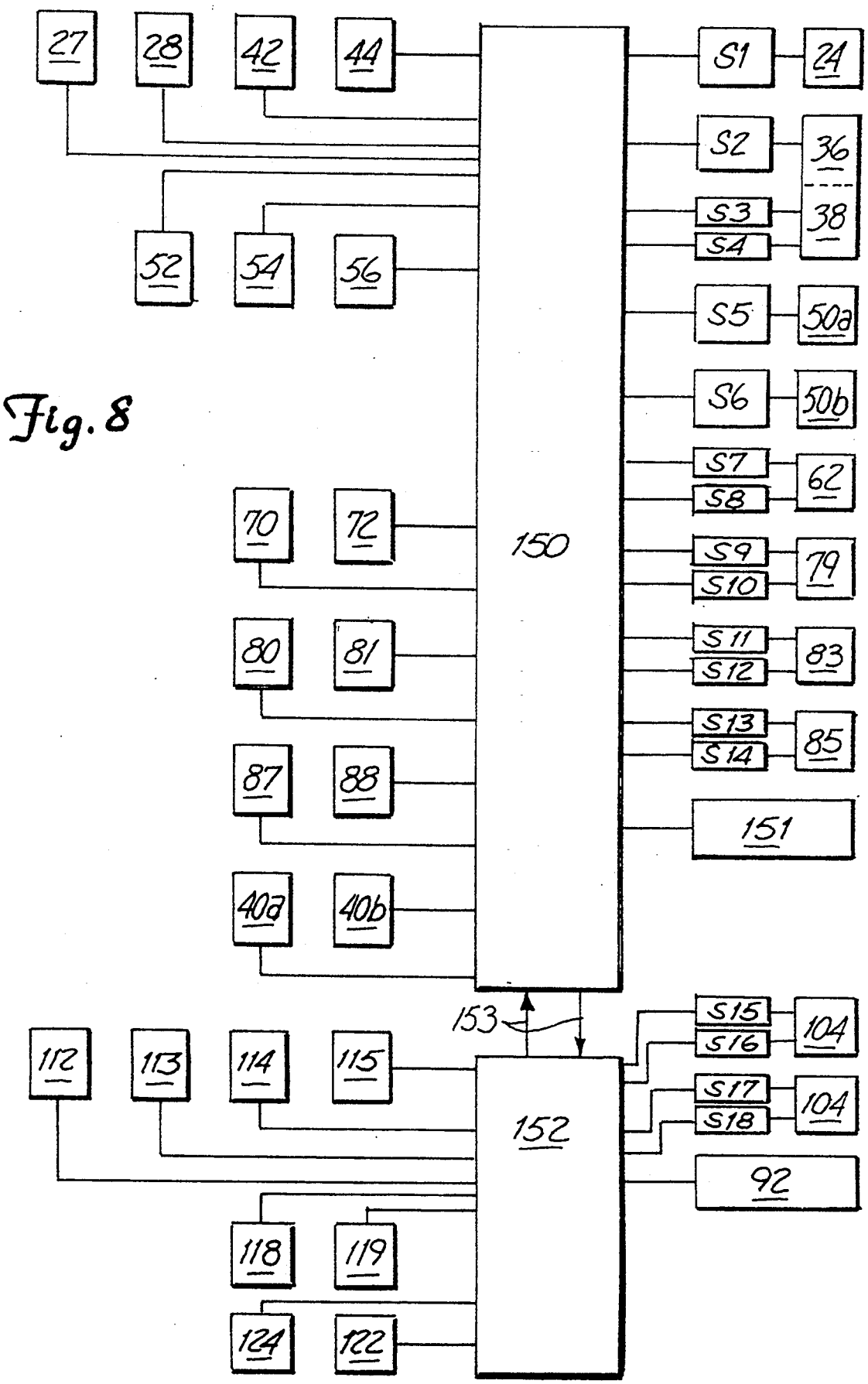
FIG. 8 shows a schematic diagram of the inputs to, and the outputs from, the control means of the present invention.

As seen schematically in FIG. 8, the present invention uses a programmable logic controller 150 for control of the operation of arranging portion 10a and loading portion 10b. Controller 150 has inputs connected to ERPE's 27, 28, 42, 44, 52, 54 and 56, proximity switches 70, 72, 80, 81, 87 and 88, and limit switches 40a and 40b. Based upon this input controller initiates operation of solenoid valves S1–S18 that, in turn, operate pneumatic cylinders 24, 36, 38, 50a, 50b, 62, 79, 85, 106 and 107 respectively. In particular, S1, when activated, operates piston 24 to lower normally-up plate 22, and similarly S2 operates to extend cylinder 36 causing lift 34 to move upwardly from its normally down position. S3 and S4 provide for the separate control of the extension and retraction respectively of cylinder 38 for transferring a bundle from lane 20a to 20b. S5 and S6 operate cylinders 50a and 50b to move plates 48 downwardly from their normal up positions. S7 and S8 provide for the separate control of the extension and retraction respectively of cylinder 62; S9 and S10 provide for the separate control of the extension and retraction respectively of cylinder 79; S11 and S12 provide for the separate control of the extension and retraction respectively of cylinder 83 and S13 and S14 provide for the separate control of the extension and retraction respectively of cylinders 85. Control 150 also operates a drive motor 151 for conveyors 14a and 14b.

A separate control 152 provides for operating lift 10c. Specifically, control 152 has inputs for limit switches 112, 113, 114, and 115, and ERPE's 118 and 119. Based upon such inputs control 152 operates step motor 92, and also, controls cylinders 104. Specifically, S15 and S16 operate cylinders 104 to extend upwardly cart lock arms 106 and 107 respectively to the cart locking position, and S17 and S18 operate to retract arms 106 and 107 respectively. Cart proximity switches 122 and 124 are a further input to control 152 and are used for determining if a cart 130 is being loaded onto base plate 139 and then is in a fully loaded position thereon respectively. Controls 150 and 152 are linked to provide for the coordinated operation of the present invention as indicated by lines 153.

For purposes of facilitating a clear understanding of the substantive structural elements of the present invention and their operation, FIGS. 1-5, do not include representations of the various above mentioned solenoid valves and control means and their pneumatic and electrical connections, such structures and their use and operation being well understood by those of skill in the art.

The preferred form of the present invention operates to load a plurality of individual bundles, marked "B", of newspapers and the like onto a wheeled cart. In general this operation first requires delivery of the bundles at a regulated rate to conveyor 14a. Such regulated delivery could include a further conveyor, seen in dashed line and marked "C" in FIG. 1, having an accumulating or diverting system. The present invention is designed to handle a stream of bundles at the rate of approximately 28 to 32 bundles per minute, and cart 130 is designed to hold approximately 28 bundles. This number of bundles would represent a total of 6 to 8 layers, 4 bundles per layer.

Figure 9A:
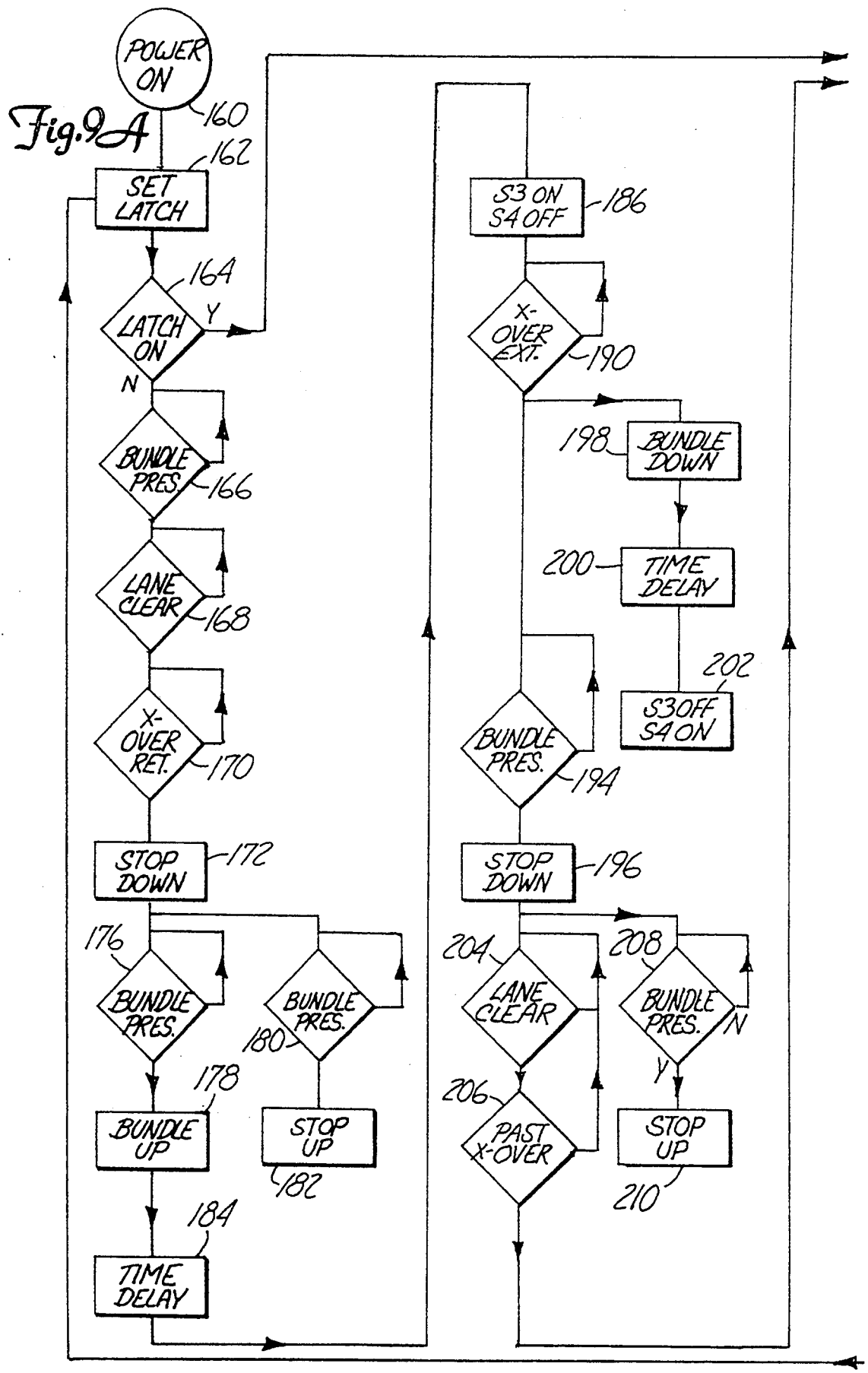
FIG. 9 shows a flow diagram of the operational control process of the arranging and loading means of the present invention.
Figure 9B:
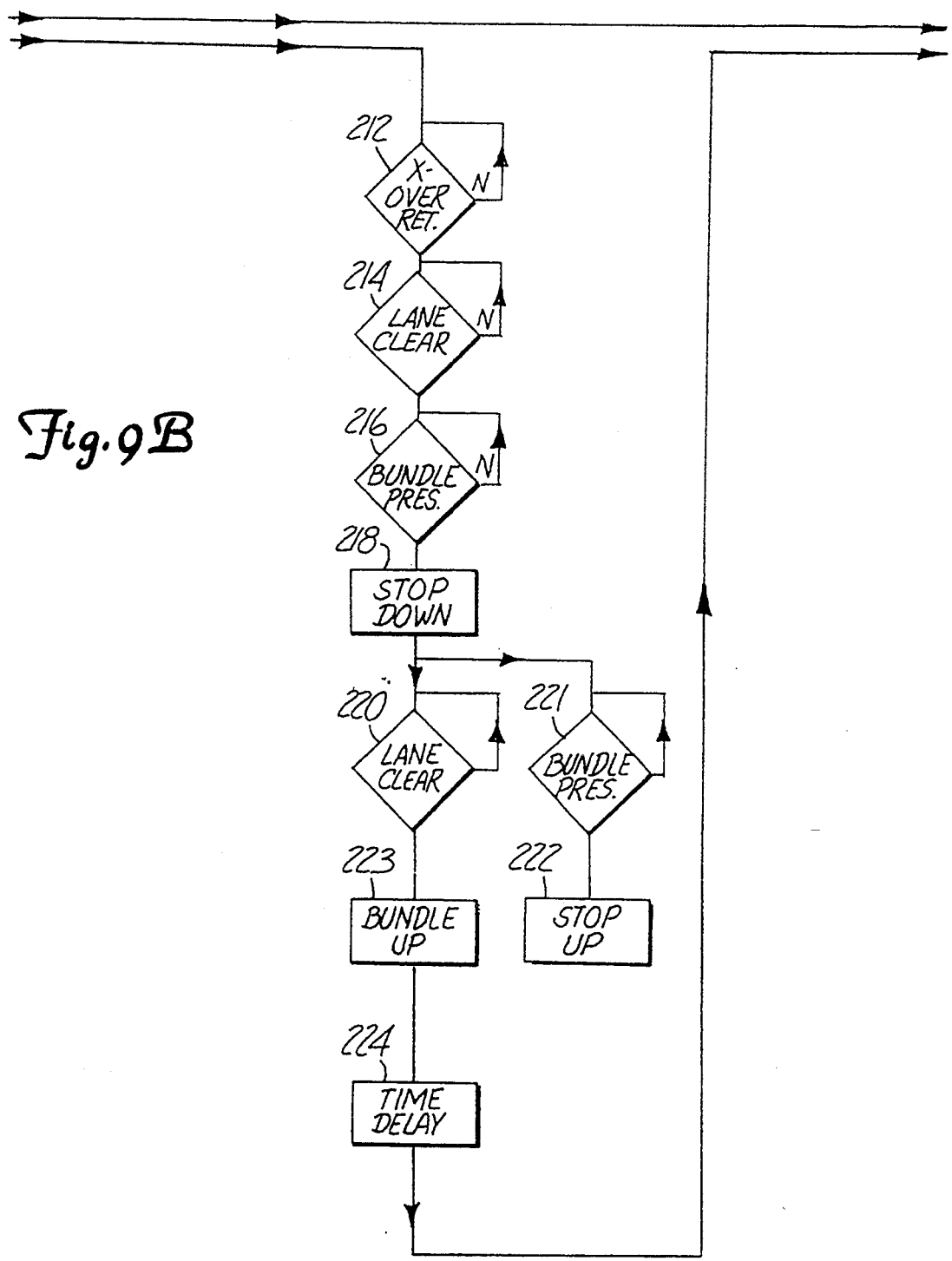
Figure 9C:
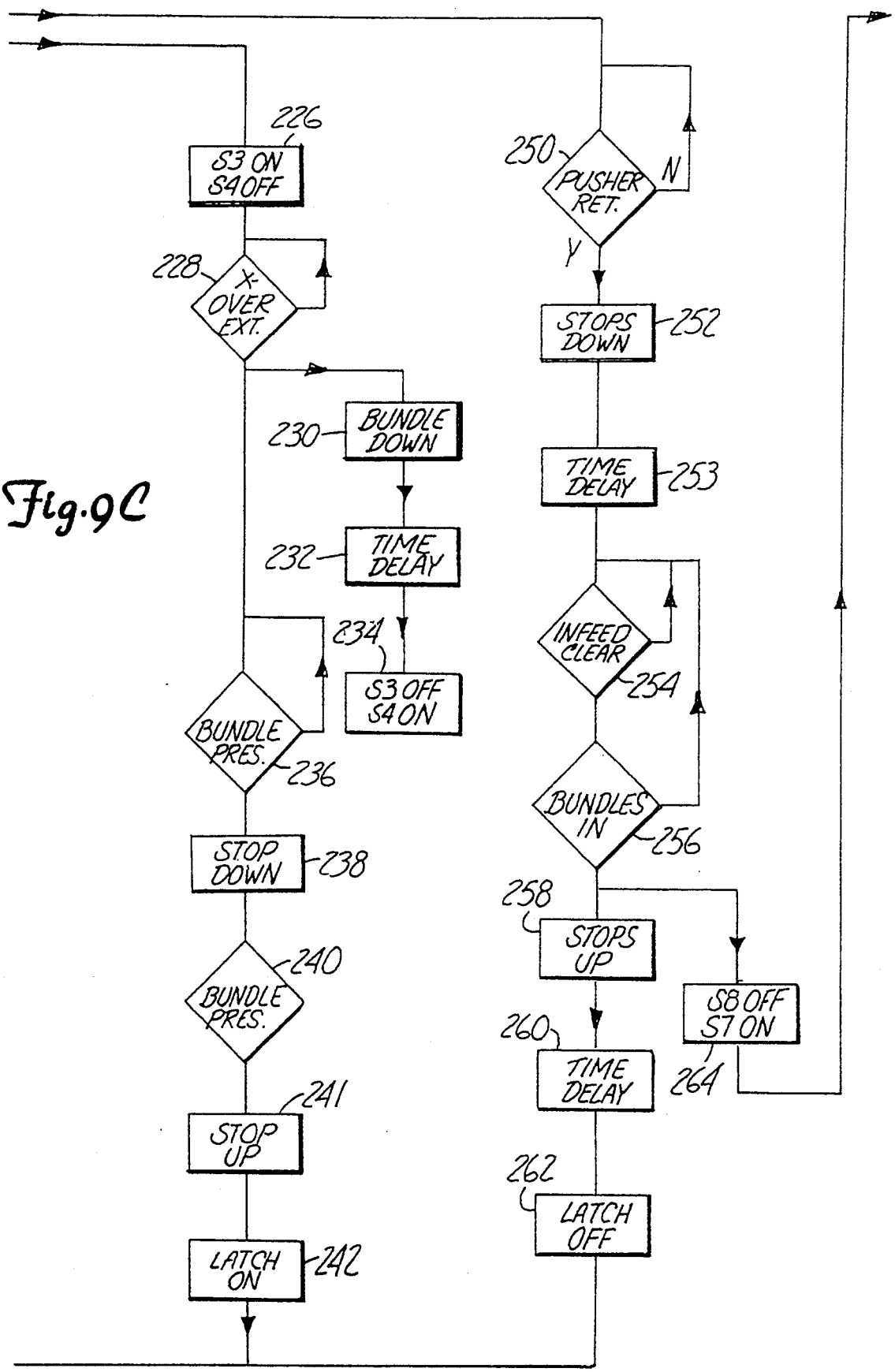
Figure 10:
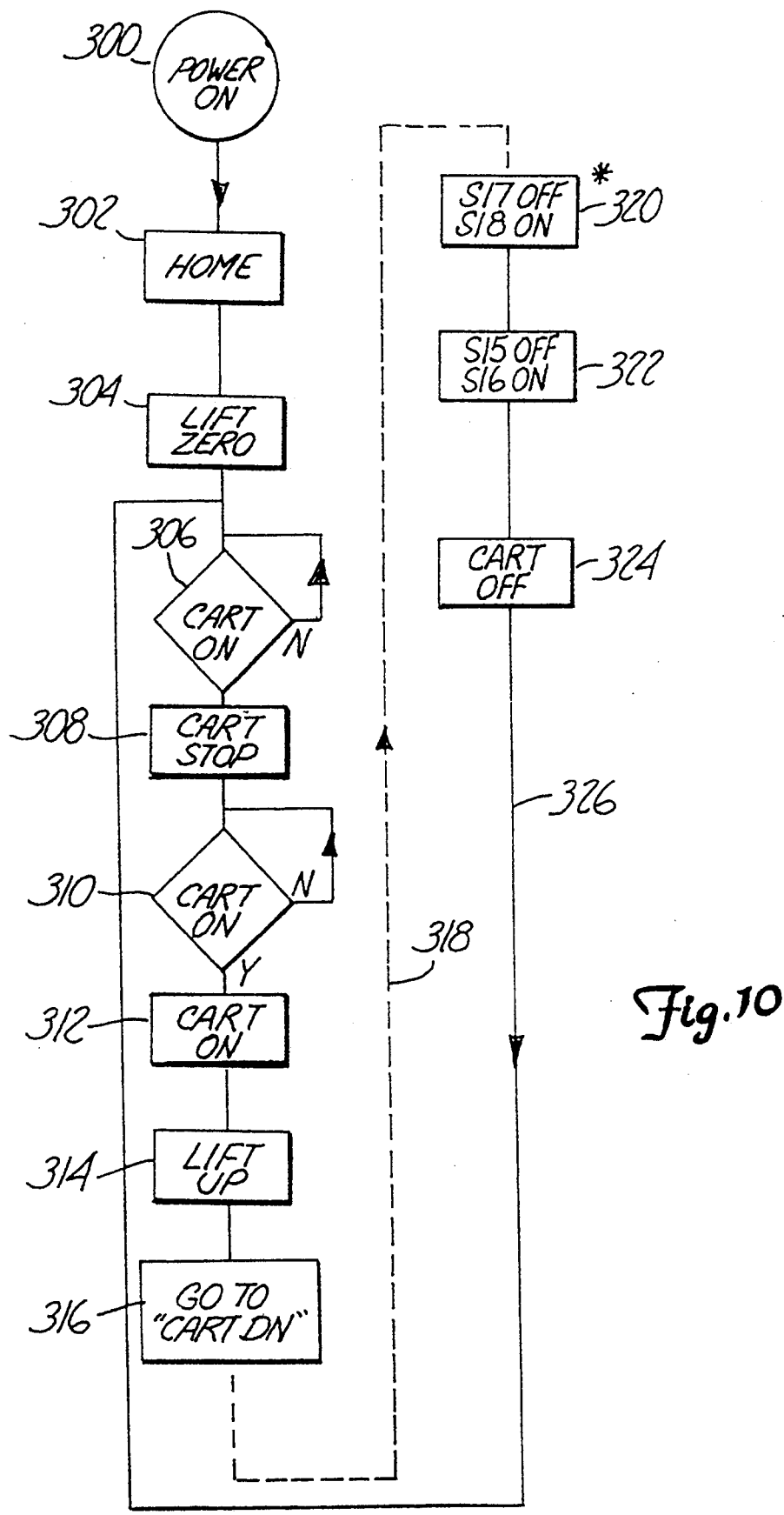
FIG. 10 shows a flow diagram of the operational control of the lift means of the present invention.

The operation of the present invention can be understood with reference to the flow charts of FIGS. 9 and 10, which charts represent the logic and sequence control of the invention herein as preformed by controls 150 and 152. The control of assembly means 10a and loading means 10b is described in FIG. 9, and FIG. 10 shows control sequence of lift means 10c. After start-up, (block 160), control 150 reviews an internal latch (block 162) to determine if four bundles have been assembled at plates 48, two bundles on each conveyor 14a and 14b. With an initial start-up condition the internal latch would not be on and (block 164) would be "NO". Control 150 assumes that any and all bundles from a previous run have been removed from machine 10 prior to a subsequent start-up after shut down. ERPE 27 is then checked (block 166) and is on if a bundle is present just prior to stop blade 22, light being reflected from the bundle back to ERPE 27. ERPE 44 is then checked and if on, no blockage between it and reflector 46, a clear lane 20b is indicated, (block 168). Switch 40a is then checked to see if cylinder 38 is retracted (block 170), and at (block 172) blade 22 is lowered by operating solenoid S1. ERPE 28 is checked to determine the presence of a bundle moving past blade 22 (block 176) and if so, solenoid S2 is turned on so that lift portion 34 lifts the bundle above conveyor 14a, (block 178). After plate 22 goes down ERPE is monitored, (block 180) and as soon as it is off, that is, as soon as the first bundle moves ahead and is no longer above ERPE 27, plate 22 is raised to block the progress of the second bundle, (block 182). After block 176, a time delay is run, (block 184), and S3 is then activated and S4 is turned off, (block 186), so that cylinder 38 is fully extended transferring the first bundle to lane 20b. Switch 40b is checked to verify that cylinder 38 has extended fully, (block 190). ERPE 27 is then checked to verify the presence of a second bundle (block 194), and if present plate 22 is lowered (block 196). Commencing at substantially the same time as the initiation of block 194, S2 is turned off, (block 198), lowering the lift portion of lane changer 30. After a time delay (block 200) to permit the clearing of the second bundle past changer 30, cylinder 38 is retracted S3 being turned off and S4 being turned on (block 202). ERPE 28 is monitored and if the beam emitted thereby is broken, signifying the passage of the second bundle, (block 204), then ERPE 42 is monitored and if light is reflected by the bottom of the bundle back to ERPE 42 a second check is had to indicate the travel of the second bundle successfully down conveyor 14a, (block 206). Again, running somewhat parallel to the foregoing blocks 204-206, or actually immediately subsequent to block 202, ERPE 27 is looked at (block 208) and if off the plate 22 is raised upon such sensing, (block 210). Switch 40a is then checked to insure that cylinder 38 is retracted, (block 212), followed by checking ERPE 44 to determine that no bundle is present at the proximal end of conveyor 14b, (block 214), after which ERPE 27 is again reviewed to verify the presence of the third bundle, (block 216), and if present plate 22 is lowered, (block 218). As previously described for the first bundle, the third bundle is transferred to conveyor 14b. Specifically, ERPE 28 is looked at (block 220) to signal when the third bundle breaks the beam thereof to trigger the lift cylinder 36 to lift the bundle above conveyor 14a (block 223). Also at this time ERPE 27 is monitored, (block 221), and if off, plate 22 is raised, (block 222). After a time delay (block 224) to permit full lifting of the bundle, S3 is turned on and S4 is turned off to extend cylinder 38 for moving the third bundle into channel 20b (block 226). Switch 40b is then checked (block 228) to verify such extension, if extended the lift portion of changer 30 is lowered placing the third bundle on conveyor 14b for transportation down channel 20b for ultimate contact with the first bundle, (block 230). After a time delay (block 232) to permit this lowering, S3 is turned off and S4 turned on, (block 234) so that cylinder 38 is retracted returning the lift portion of lane changer 30 to lane 14a. Also, immediately subsequent to block 228 and parallel with blocks 230-234, ERPE 27 is checked (block 236) and if a fourth bundle is present plate 22 is lowered (block 238). ERPE 27 is then checked (block 240) to sense if it is off so that plate 22 can be raised, (block 241) preventing the travel of the further bundle. At (block 242) the internal latch is turned on after the arranging of four bundles at stop plates 48.

With the internal latch on, block 162 being reset from the initial off condition at start-up, the controller follows the sequence commencing at (block 250). At (block 250) switch 70 is checked to verify that cylinder 62 is fully retracted. If so, then plates 48 are lowered (block 252) by operating S5 and S6. The four bundles then move into and stop at loading position 61 immediately adjacent plate 64 after contacting conveyor end plate 63. After a delay (block 253) to permit the four bundles to completely enter into the loading position 61, ERPE 52 is looked at, (block 254) and if the beam therefrom is broken a mis-positioned bundle is indicated and the control waits until ERPE is again on or uninterrupted. ERPE's 54 and 56 are looked at, (block 256) and if the beams emitted thereby are broken it will be understood that this is a positive indication that two bundles are properly in position at the ends of conveyors 14a and 14b. Blades 48 are then raised, (block 258) and after a delay to allow for the raising of plates 48, (block 260) the internal latch is returned to off, (block 262). It can be appreciated that with blades 48 up, arranging portion 10a can again arrange a further set of four bundles. At block 264 S7 is turned on and S8 turned off to extend cylinder 62. Switch 72 is checked to verify the full extension of cylinder 62, (block (266). As previously mentioned, lift 10c has a separate control 152 therefor, which control provides for the proper positioning of platform 98 so that cart 130 is held at the proper level to receive successive layers of bundles as such bundles are deposited therein. At (block 268) a determination is made if the cart is at the proper position to receive a layer of bundles, i.e. the cart is either empty and at the top lift position to receive its first layer of bundles, or not completely full and able to receive a further layer of bundles. If the cart is in position to receive a bundle layer S10 is turned off and S9 turned on, (block 270) so that cylinder 79 is fully retracted wherein carrier 74 is in position to be loaded. At block 272 S8 is turned off and S7 turned on to extend cylinder 62 thereby pushing the four bundles onto carrier 74. Switch 72 is checked to verify that cylinder 62 is fully extended, (block 274), and switch 80 is checked to insure that cylinder 79 is fully retracted, (block 276). If cylinders 62 and 79 are in the proper position, S11 is turned off and S12 turned on (block 278) so that cylinder 83 is extended lowering blocking plate 86. The full extension of cylinder 83 is checked by switch 88, (block 280) after which S14 is turned off and S13 turned on so that cylinders 85 extend, (block 281). It will be appreciated by those of skill that cylinders 85 are used to insure that the grouping of four bundles are pushed firmly against the back wall 132 of cart 130, to provide for orderly loading thereon. S9 is then turned off and S10 turned on, (block 282) so that carrier cylinder 79 is retracted returning carrier 74 to its former position. It can be clearly understood that as carrier 74 returns to its original position the presence of plate 86 blocks the four bundles causing them to be deposited into cart 130. The full retraction of cylinder 79 is checked by review of switch 80, (block 284). If carrier 74 is completely retracted, S13 is turned off and S14 turned on, (block 286), retracting cylinders 85, and S11 is turned off and S12 turned on retracting cylinder 83 so that plate 86 is raised, (block 287). The full retraction of cylinder 83 is then checked by review of switch 87, (block 288). A command is then sent from control 150 to control 152 initiating the lowering of the cart, (block 290). During that lowering ERPE's 118 and 119 are monitored, (block 292) as well as limit switch 114, (block 294). As the cart is lowered by lift 10c the bundles will eventually go below the level of the light pattern of ERPE's 118 and 119 permitting the reflecting of light thereto for providing a means for signaling that the lowering can stop, (block 296) so that a further layer of bundles can be added by signaling a "cart ok" message to (block 268) However, if during such lowering limit switch 114 is triggered before ERPE's 118 and 119 are turned on, then the cart can not be lowered sufficiently to allow a further layer of bundles and the cart is therefore full. If the cart is full control 150 operates lift 10c to the zero or bottom position, (block 298), so that the cart can then proceed through the further cart unload steps as indicated by block 299 referring to the asterisk "*" of block 320 of FIG. 10.

Referring also to FIG. 10, Block 300 represents the same start or power up point of block 160 of FIG. 9. At power-up lift 10c determines a home position for platform 98, (block 302) from which reference the position of platform 98 can be accurately known and controlled. Platform 98 is then moved to a loading or zero position, (block 304), for permitting the loading of a cart thereon. Cart proximity switch 122 is monitored, (block 306), and if no cart is present control 150 waits until a cart is placed on platform 98. The loading of a cart can be accomplished manually by rolling it into tracks 100 of base 99 through the use for example of a ramp, not shown, running up to base 99 from a ground level. If a cart is being loaded onto base 99 in the direction as indicated in FIG. 1 by arrow L, then as switch 122 senses the presence of the cart, (block 308), arm 107 is operated to the up position to provide for a stop preventing the further progress of the cart and preventing its rolling off the opposite side of base 99. Sensor 124 when activated indicates that the cart is fully on base 99, (block 310), after which arm 106 is operated to the up position, (block 312), locking the cart on base 99. Lift 10c is then operated to bring the cart to a top position suitable for receiving a first layer of bundles, (block 314), as indicated by limit switch 113. It will be appreciated that switches 112 and 115 are safety switches that if turned on indicate over-running of platform 98 whereupon motor 92 is shut down to prevent damage to lift 10c. At (block 316) a signal is sent to control 150 that the cart is in position. With respect to the flow diagram of FIG. 9, such signal would arrive at the "cart ok" block 268 whereupon loading of the cart could then proceed. This loading time is represented by the dashed line 318 of FIG. 10. As mentioned above, when block 299 of FIG. 9 is reached and the cart is full, the operative sequence moves to FIG. 10. Specifically, at (block 320), S17 is turned off and S18 turned on to lower arm 107 and S15 and S16 are likewise operated to lower arm 106, (block 322). The cart being unlocked can then be rolled off base 99, (block 324). After block 324 a further cart can then be placed in position on lift 10c to repeat the process, as indicated by line 326. It will be understood that the control of the present invention at the various decision blocks of FIGS. 9 and 10 waits for the appropriate signal to proceed.

Figure 7:
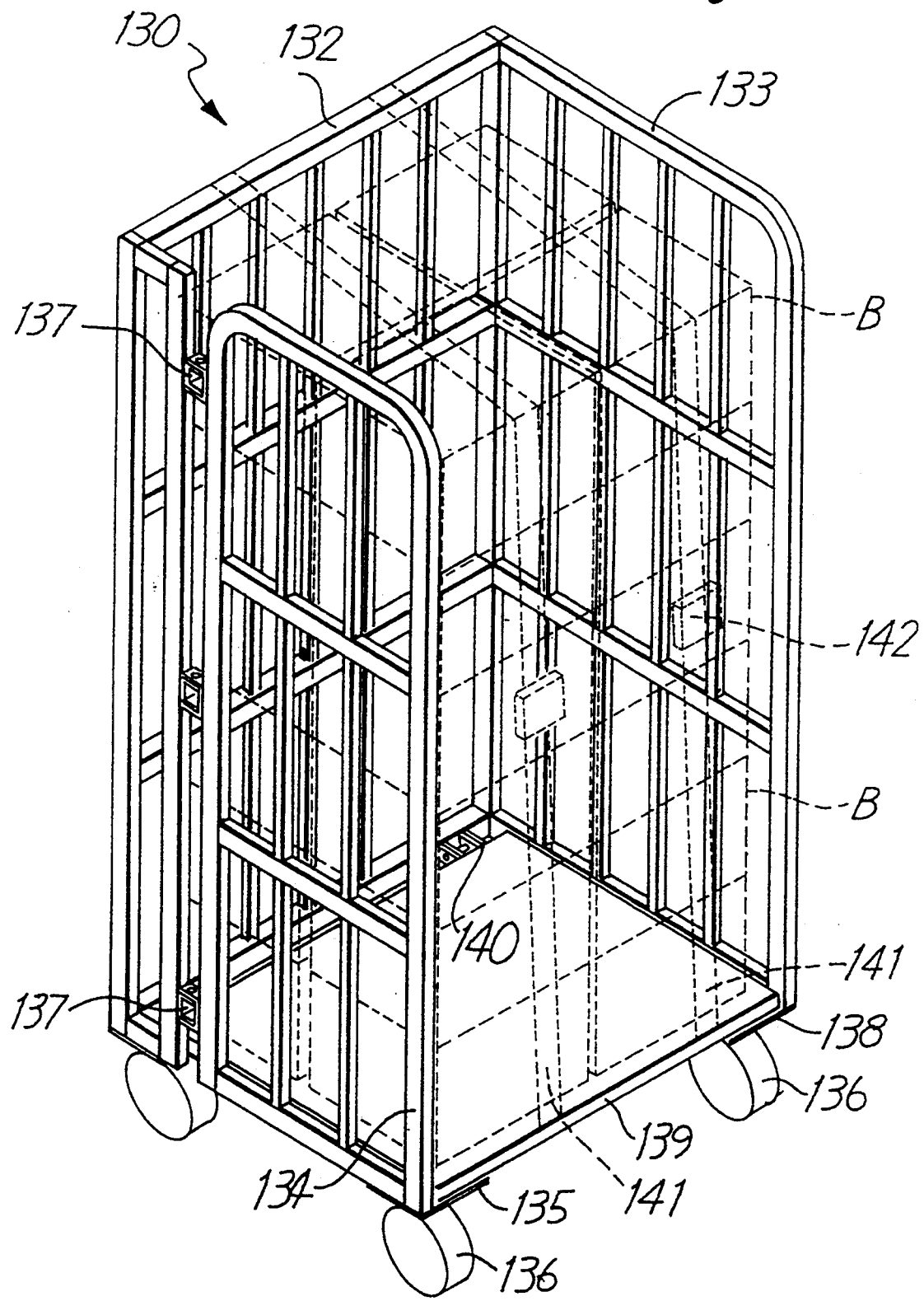
FIG. 7 shows a second perspective view of the cart of the present invention.

The operation of cart 130 can be understood wherein straps 141 are draped exterior to sides 133 and 134 when cart 130 is being loaded with bundles. After loading, as represented in FIG. 7, straps 141 are used to retain bundles B, and can be tightened by use of adjustment buckles 142. After unloading of the bundles at the delivery location cart 130 can be collapsed to a smaller size by first lifting base 139 up against back wall 132 as indicated by arrow A, and then folding wall 134 against back wall 132, as indicated by arrow B.

It will be understood that various modifications can be made to the present invention that will fall within the inventive concept thereof. Therefore, the present invention is not limited in scope to the particular embodiment disclosed herein.

We claim:
1. An apparatus for loading successive layers of objects onto cart means, comprising:
    arranging means for arranging and delivering a plurality of the objects to a first loading position in a loading means, the arranging means including con- veying means having a drive means and first and second separate conveying lanes extending parallel to each other for conveying the objects from intake ends thereof to the first loading position, the first lane intake end for receiving the objects from a conveyed source thereof and the conveying means having a first regulating means at the first lane intake end for regulating the progression of the objects along the first lane, and the conveying means having transfer means intermediate the first regulating means and the first loading position for selectively transferring individual objects from the first lane to the second lane for permitting the formation at the first position of a symmetrically arranged group of the objects consisting of one or more pairs of the objects;

the loading means including moving means and carrier means, the moving means for moving the arranged group from the first loading position onto the carrier means when the carrier means is located at a second loading position, the carrier means operable to move the arranged group from the second loading position to an unloading position, and the carrier means and the moving means operable in a common linear direction transverse to the direction of travel of the objects along the conveying means, lift means for providing lifting and lowering of the cart means to a plurality of positions, the cart means having an interior volume for holding one or more layers of the arranged group, and the lift means positioned with respect to the carrier means and the cart means positioned on the lift means so that the carrier means is movable into the cart means interior volume wherein when the carrier means is in the unloading position the arranged group is located substantially within the cart means interior volume, and the loading means including retaining means for retaining the arranged group in the cart means when the carrier means moves from the unloading position back to the second loading position so that the arranged group of objects is deposited in the cart means, and control means connected to the first regulating means, the transfer means, the moving means, the carrier means, the retaining means and the lift means for providing controlled operation thereof so that successive layers of the arranged group can be loaded onto the cart means.

2. The apparatus as defined in claim 1, and the moving means including a first drive cylinder secured to a frame of the loading means and the first drive cylinder connected to a pushing plate for linear operation thereof between a retracted position and an extended position for moving an arranged group of objects from the first loading position to the second loading position for loading thereof onto the carrier means.

3. The apparatus as defined in claim 2, and the moving means including first and second position sensing means connected to the control means for sensing when the pushing plate is in the retracted position or the extended position.

4. The apparatus as defined in claim 1, and the carrier means having a flat bottom surface and support means extending upwardly from the bottom surface for providing slideable suspension from a loading means frame and the carrier means operated by a first drive cylinder secured to the loading means frame and operable to move the carrier means between the second loading position and the unloading position.

5. The apparatus as defined in claim 4, and the carrier means including first and second position sensing means connected to the control means for sensing when the carrier means is in the second loading position or the unloading position respectively.

6. The apparatus as defined in claim 1, and the retaining means comprising a first drive cylinder secured to a loading means frame and the first drive cylinder for moving a blocking plate from a top position to a bottom position after the carrier means has moved to the unloading position so that the blocking plate prevents objects in the carrier means from moving with the carrier means when the carrier means moves back to the second position whereby the objects are deposited in the cart means.

7. The apparatus as defined in claim 6, and the unloading means including first and second blocking plate position sensing means connected to the control means for sensing when the blocking plate is in the top position or the bottom position respectively.

8. The apparatus as defined in claim 6, and the blocking plate operable by a second drive cylinder to extend in a direction transverse to the operation of the first drive cylinder after the blocking plate is in the bottom position for pushing the arranged group of objects into the cart means for insuring positioning of the arranged group against a back wall of the cart means.

9. The apparatus as defined in claim 1, and the lift means including a lift frame and the lift frame having drive means operably connected to a cart platform, the platform for retaining the cart means thereon and the drive means connected to the control means for controlling the operation of the platform for moving the cart means to the plurality of positions.

10. The apparatus as defined in claim 9, and the lift means including object level sensing means connected to the control means for sensing a top surface level of a top layer of arranged objects in the cart means.

11. The apparatus as defined in claim 1, and the arranging means having second and third regulating means along the first and second conveying lanes respectively adjacent the first position for regulating the movement of objects there beyond into the first position.

12. An apparatus for loading successive layers of objects onto cart means, comprising:

arranging means for arranging and delivering a plurality of the objects to a first loading position in a loading means, the arranging means including conveying means having a drive means and first and second separate conveying lanes extending parallel to each other for conveying the objects from intake ends thereof to the first loading position, the first lane intake end receiving the objects from a conveyed source thereof and having a regulating means, the regulating means for regulating the progression of the objects along the first lane, and the conveying means having transfer means for selectively transferring individual objects from the first lane to the second lane for permitting the formation at the first position of symmetrically arranged group of the objects consisting of one or more pairs of the objects;

the loading means including moving means and carrier means, the moving means for moving the arranged group from the first loading position onto the carrier means when the carrier means is located at a second loading position, the carrier means operable to move the arranged group from the second loading position to an unloading position, lift means for providing lifting and lowering of the cart means to a plurality of positions, the cart means having an interior volume for holding one or more layers of the arranged group, and the lift means positioned with respect to the carrier means and the cart means positioned on the lift means so that the carrier means is movable into the cart means interior volume wherein when the carrier means is in the unloading position the arranged group is located substantially within the cart means interior volume, and the moving means and carrier means moving the arranged group in a common linear direction transverse to the direction of travel of the objects along the first and second lanes, and the loading means including retaining means for retaining the arranged group in the cart means when the carrier means moves from the unloading position back to the second loading position so that the arranged group of objects is deposited in the cart means, and control means connected to the regulating means, the transfer means, the moving means, the carrier means, the retaining means and the lift means for providing controlled operation thereof so that successive layers of the arranged group can be loaded onto the cart means.

13. The apparatus as defined in claim 12, and the moving means including a first drive cylinder secured to a frame of the loading means and the first drive cylinder connected to a pushing plate for linear movement thereof between a retracted position and an extended position for moving the arranged group of objects from the first loading position to the second loading position for loading the arranged group onto the carrier means.

14. The apparatus as defined in claim 13, and the moving means including first and second position sensing means connected to the control means for sensing when the pushing plate is in the retracted position or the extended position.

15. The apparatus as defined in claim 12, and the carrier means having a flat bottom surface and support means extending upwardly from the bottom surface for providing slideable suspension from a loading means frame and the carrier operated by a first drive cylinder secured to the loading means frame and operable to move the carrier between the second loading position and the unloading position.

16. The apparatus as defined in claim 15, and the carrier means including first and second position sensing means connected to the control means for sensing when the carrier means is in the second loading position or the unloading position respectively.

17. The apparatus as defined in claim 12, and the retaining means comprising a first drive cylinder secured to a loading means frame and the first drive cylinder for moving a blocking plate from a top position to a bottom position after the carrier means has moved to the unloading position so that the blocking plate prevents objects in the carrier means from moving with the carrier means when the carrier means moves back to the second position whereby the objects are deposited in the cart means.

18. The apparatus as defined in claim 17, and the unloading means including first and second blocking plate position sensing means connected to the control means for sensing when the blocking plate is in the top position or the bottom position respectively.

19. The apparatus as defined in claim 17, and the blocking plate operable by a second drive cylinder to extend in a direction transverse to the operation of the first drive cylinder after the blocking plate is in the bottom position for pushing the arranged group of objects into the cart means for insuring positioning of the arranged group against a back wall of the cart means.

20. The apparatus as defined in claim 12, and the lift means including a lift frame and the lift frame having drive means operably connected to a cart platform, the platform for retaining the cart means thereon and the drive means connected to the control means for controlling the operation of the platform for moving the cart means to the plurality of positions.

21. The apparatus as defined in claim 20, and the lift means including object level sensing means connected to the control means for sensing a top surface level of a top layer of arranged objects in the cart means.

22. The apparatus as defined in claim 12, and the arranging means having second and third regulating means along the first and second conveying lanes respectively adjacent the first position for regulating the movement of objects there beyond into the first position.

23. An apparatus for loading successive layers of objects onto cart means, comprising:

arranging means for arranging and delivering a plurality of the objects to a first loading position in a loading means, the arranging means including conveying means having a drive means and first and second separate conveying lanes extending parallel to each other for conveying the objects from intake ends thereof to the first loading position, the first lane intake end receiving the objects from a conveyed source thereof and having a regulating means, the regulating means for regulating the progression of the objects along the first lane, and the conveying means having transfer means for selectively transferring individual objects from the first lane to the second lane for permitting the formation at the first position of a symmetrically arranged group of the objects consisting of one or more pairs of the objects;

the loading means including moving means and carrier means, the moving means for moving the arranged group from the first loading position onto the carrier means when the carrier means is located at a second loading position, the carrier means operable to move the arranged group from the second loading position to an unloading position, and the moving means including a first drive cylinder secured to a frame of the loading means and the first drive cylinder connected to a pushing plate for linear operation thereof between a retracted position and an extended position for moving the arranged group of objects from the first loading position to the second loading position for loading thereof onto the carrier means, lift means for providing lifting and lowering of the cart means to a plurality of positions, the cart means having an interior volume for holding one or more layers of the arranged group, and the lift means positioned with respect to the carrier means and the cart means positioned on the lift means so that the carrier means is movable into the cart means interior volume wherein when the carrier means is in the unloading position the arranged group is located substantially within the cart means interior volume, and the loading means including retaining means for retaining the arranged group in the cart means when the carrier means moves from the unloading position back to the second loading position so that the arranged group of objects is deposited in the cart means, and control means connected to the regulating means, the transfer means, the moving means, the carrier means, the retaining means and the lift means for providing controlled operation thereof so that successive layers of the arranged group can be loaded onto the cart means.

24. The apparatus as defined in claim 23, and the moving means including first and second position sensing means connected to the control means for sensing when the pushing plate is in the retracted position or the extended position.

25. The apparatus as defined in claim 24, and the carrier means having a flat bottom surface and support means extending upwardly from the bottom surface for providing slideable suspension from a loading means frame and the carrier means operated by a second drive cylinder secured to the loading means frame and operable to move the carrier between the second loading position and the unloading position.

26. The apparatus as defined in claim 25, and the carrier means including first and second position sensing means connected to the control means for sensing when the carrier means is in the second loading position or the unloading position respectively.

27. The apparatus as defined in claim 26, and the retaining means comprising a third drive cylinder secured to the loading means frame and the third drive cylinder for moving a blocking plate from a top position to a bottom position after the carrier means has moved to the unloading position so that the blocking plate prevents objects in the carrier means from moving with the carrier means when the carrier means moves back to the second position whereby the objects are deposited in the cart means.

28. The apparatus as defined in claim 27, and the unloading means including first and second blocking plate position sensing means connected to the control means for sensing when the blocking plate is in the top position or the bottom position respectively.

29. The apparatus as defined in claim 28, and the lift means including a lift frame and the lift frame having drive means operably connected to a cart platform, the platform for retaining the cart means thereon and the drive means connected to the control means for controlling the operation of the platform for moving the cart means to the plurality of positions.

30. The apparatus as defined in claim 29, and the lift means including object level sensing means connected to the control means for sensing a top surface level of a top layer of arranged objects in the cart means.

31. The apparatus as defined in claim 30, and the arranging means having second and third regulating means along the first and second conveying lanes respectively adjacent the first position for regulating the movement of objects there beyond into the first position.

32. The apparatus as defined in claim 27, and the blocking plate operable by a fourth drive cylinder to extend in a direction transverse to the operation of the third drive cylinder after the blocking plate is in the bottom position for pushing the arranged group of objects into the cart means for insuring positioning of the arranged group against a back wall of the cart means.

* * * * *